United States Patent
Walker et al.

(10) Patent No.: US 6,327,573 B1
(45) Date of Patent: Dec. 4, 2001

(54) MULTIPLE PARTY REWARD SYSTEM UTILIZING SINGLE ACCOUNT

(75) Inventors: Jay S. Walker, Ridgefield; Andrew S. Van Luchene, Norwalk; Daniel E. Tedesco, New Canaan, all of CT (US); Joshua D. Rogers, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/223,900

(22) Filed: Dec. 31, 1998

(51) Int. Cl.[7] .............................. G06F 17/60; G06F 17/00
(52) U.S. Cl. .................................................. 705/14
(58) Field of Search .................................................. 705/14

(56) References Cited

U.S. PATENT DOCUMENTS

| | | |
|---|---|---|
| 4,833,607 | 5/1989 | Dethloff et al. . |
| 4,837,422 | 6/1989 | Dethloff et al. . |
| 4,876,592 | 10/1989 | Van Kohorn ........................... 358/94 |
| 5,025,372 | 6/1991 | Burton et al. . |
| 5,056,019 | 10/1991 | Schultz et al. . |
| 5,227,874 | 7/1993 | Von Kohorn . |
| 5,287,181 | 2/1994 | Holman . |
| 5,287,269 * | 2/1994 | Dorrough et al. ................... 364/408 |
| 5,473,144 * | 12/1995 | Mathurin, Jr. ....................... 235/380 |
| 5,503,434 * | 4/1996 | Gunn ..................................... 283/67 |
| 5,537,314 | 7/1996 | Kanter . |
| 5,621,640 | 4/1997 | Burke . |
| 5,770,843 | 6/1998 | Rose . |
| 6,044,360 | 3/2000 | Picciallo ................................ 705/21 |
| 6,128,599 * | 10/2000 | Walker et al. ........................ 705/14 |

FOREIGN PATENT DOCUMENTS 2313340   11/1997   (DE) .

OTHER PUBLICATIONS

Jon Berry, "Friends & Family Raises Privacy Issues", Adweek, Section: News; p. 4, Mar. 25, 1991.
Carol Casper, "Restaurants Seek Loyal Customers", Direct, vol. 6; No. 5; p. 18, May 1994.
"The Subway Route Toward Fast–Food Acceptance of On–Line Debit", Debit Card News, Jun. 18, 1997.
"Burger King to Test Smart Cards to Speed Up Fast Food", Agence France Presse, Jun. 3, 1998.
Tom Stieghorst, "Hold the Pickles, Hold the Cash; Burger King Tests Smart Cards", Sun–Sentinal(Fort Lauderdale, FL), Jun. 4, 1998.
"Verifone and McDonald's Introduce Electronic Cash Smart Card Solution to Consumers; German Program Represents Significant Step for Smart Card Global Adoption", Business Wire, Aug. 17, 1998.
"Sam's Club Membership Warehouse for Business & Home", Wal*Mart Online (http://www.samsclub.com/index.shtml) Download Date Mar. 16, 1999.
Shulman, R.E. 1990. Getting started with your . . . program. Supermarket Business Mag. 45(19): 19, 30.*
Customer Recognition/Activity Recording, Intorduction to 4680–4690 EM.*

* cited by examiner

Primary Examiner—Eric W. Stamber
Assistant Examiner—James W. Myhre
(74) Attorney, Agent, or Firm—Dean P. Alderucci

(57) ABSTRACT

A method enabling a frequent shopper reward system capable of tracking performance data of a plurality of members or account holders linked to a single frequent shopper account.

30 Claims, 14 Drawing Sheets

| PHYSICAL PRESENCE RULES | |
| --- | --- |
| | 450 |
| PRESENCE REQUIRED FOR REWARD (Y/N)? | |
| NUMBER REQUIRED TO BE PRESENT = AAA | |
| PRIMARY REQUIRED TO BE PRESENT (Y/N)? | |
| OTHER PHYSICAL PRESENCE RULES | |

| TRANSACTION RULES | |
| --- | --- |
| | 460 |
| TOTAL TRANSACTION VALUE ≥ BBB | |
| ENHANCED REWARD TRANSACTION ITEMS = ER1, ER2, ER3,...ERX | |
| DEGRADED REWARD TRANSACTION ITEMS = DR1, DR2, DR3,...DRX | |
| REQUIRED REWARD TRANSACTION ITEMS = RR1, RR2, RR3,...RRX | |
| TIME OF DAY PROMOTION | |
| DAY OF WEEK PROMOTION | |
| FREQUENCY OF TRANSACTION PROMOTION | |
| OTHER TRANSACTION RULES | |

| REWARD RULES | |
| --- | --- |
| | 470 |
| REWARD ACCRUAL RULES | |
| REWARD TIER RULES | |
| REWARD ALLOCATION RULES | |
| REWARDS: PRESENT DISCOUNT, FUTURE DISCOUNT, COUPON, FREQUENT FLIER MILES | |
| OTHER REWARD RULES/ REWARDS | |

FIG. 4B

| AFFILIATION RULES 480 |
|---|
| USE OF CREDIT CARD FROM BANK A + X POINTS |
| USE OF STORE CREDIT CARD + X POINTS |
| AUTOMATIC LINK TO FREQUENT FLIER PROGRAM (Y/N)? |
| AUTOMATIC LINK TO AFFILIATER REWARD PROGRAM(Y/N)? |
| OTHER AFFILIATION RULES |

FIG. 4C

MULTIPLE PARTY REWARD SYSTEM UTILIZING SINGLE ACCOUNT

BACKGROUND OF THE DISCLOSURE

1. Field of the Invention

This invention generally relates to incentive reward systems and, more specifically, to frequent shopper card programs.

2. Background of the Invention

Frequent shopper cards are used in the retail industry to reward customers for their loyalty and to create incentives for customer patronage. Frequent shopper programs allow customers to feel as though they are getting a fair deal or an added bonus when they purchase more products. Furthermore, retail establishments benefit from the revenue increase generated by the additional purchasing that a reward program encourages. In effect frequent shopper cards are a constant companion for many buyers at retail stores and more recently at quick service restaurants.

A frequent shopper card may comprise a non-intelligent card, e.g., a credit card, or a "smart" card. A smart card typically comprises memory suitable for holding information indicative of, e.g., a present monetary value of the card, a processor for controlling access to the memory such that the monetary value may be increased or decreased in response to a transaction, an interface to, e.g., point of sale terminals used to transact with the bearer of the smart card. A PDA (Personal Data Assistant) or other portable computer which may store electronic cash may function as the frequent shopper card described herein.

Several quick service restaurants have begun to use frequent shopper cards for purchase based reward programs. For example, one such restaurant has tested a smart-card based frequent shopper program that lets consumers go cash-free and earn bonus points toward free meals when they use the card at designated restaurants. A terminal located within a restaurant is used to increase a stored monetary value of a card in exchange for cash. The terminals may also be used to check the status of the card (i.e., operational or malfunctioning) or determine the present value of the card. Customers earn 1 point for each dollar of food purchased with the card. For 10 points, customers receive, e.g., a free breakfast value meal; for 15 points they receive a predefined meal, and for 20 points they earn a meal of their own choosing.

A second quick service restaurant rewards the frequent customer with prizes that increase in value through a series of, e.g., 16 visits, after which the cycle repeats. Prizes range from simple discounts on food to offers from record and video stores. The reward must be claimed after each cycle.

A third quick service restaurant distributes frequent shopper cards to its Frequent Customer Club members. Members can earn a credit for each visit plus credits based on the dollar value of purchases. A five credit ticket is granted to the customer when their card has accumulated five credits on five different purchases. These tickets can be collected and exchanged for bonus food or logo merchandise.

A fourth quick service restaurant tested a frequent shopper rewards program card that lets customers collect points toward a free sandwich each time they make a purchase using on-line and off-line debit cards or credit cards issued by a participating bank.

Unfortunately, the aforementioned frequent shopper programs do not allow multiple users to utilize a single account card. That is, these programs require that every program participant have an individual frequent shopper card. Consequently, these programs do not provide a mechanism for rewarding customers accompanying the customer participating in the program.

Therefore, it is seen to be desirable to provide a frequent shopper card program addressing the aforementioned disadvantages. Specifically, it is seen to be desirable to provide a method for rewarding multiple shoppers within a frequent shopper reward program using a single frequent shopper card.

SUMMARY OF THE INVENTION

This invention generally relates to incentive reward systems and, more specifically, to a method enabling a frequent shopper reward system capable of tracking performance data of a plurality of members or account holders linked to a single frequent shopper account.

Specifically, in a transaction environment, a reward method according to the invention comprises the steps of: retrieving, in response to an account identifier, a customer record associated with the account identifier, the customer record including account information identifying a plurality of sub-account holders; determining which of the plurality of sub-account holders are present; transacting with at least one of the present sub-account holders; calculating a reward level; allocating, to at least one of the present sub-account holders, at least a portion of the determined reward level; and updating the retrieved customer record.

BRIEF DESCRIPTION OF THE DRAWINGS

The teachings of the present invention can be readily understood by considering the following detailed description in conjunction with the accompanying drawings, in which:

FIGS. 4B and 4C depict an exemplary frequent shopper rules database in tabular form and suitable for use in the transaction system of FIG. 1;

To facilitate understanding, identical reference numerals have been used where possible to designate identical elements that are common to the figures.

DETAILED DESCRIPTION

The present invention comprises a method and apparatus enabling a frequent shopper reward system capable of tracking performance data of a plurality of members or account holders linked to a single frequent shopper account. In this manner, a frequent shopper card of, e.g., a primary member or account holder, may be used in virtually any transaction environment to identify a plurality of sub-account holders and responsively update performance data associated with the sub-account holders.

While the invention is primarily described herein within the context of a retail sales and/or service transaction environment, it will be understood by those skilled in the art that the invention has applicability beyond these transactional environments. For example, a physical access transaction environment embodiment will be disclosed in which physical access via, e.g., a turnstile is granted or denied to a plurality of present sub-account holders using a single frequent shopping card (i.e., an access card).

Figure 1:
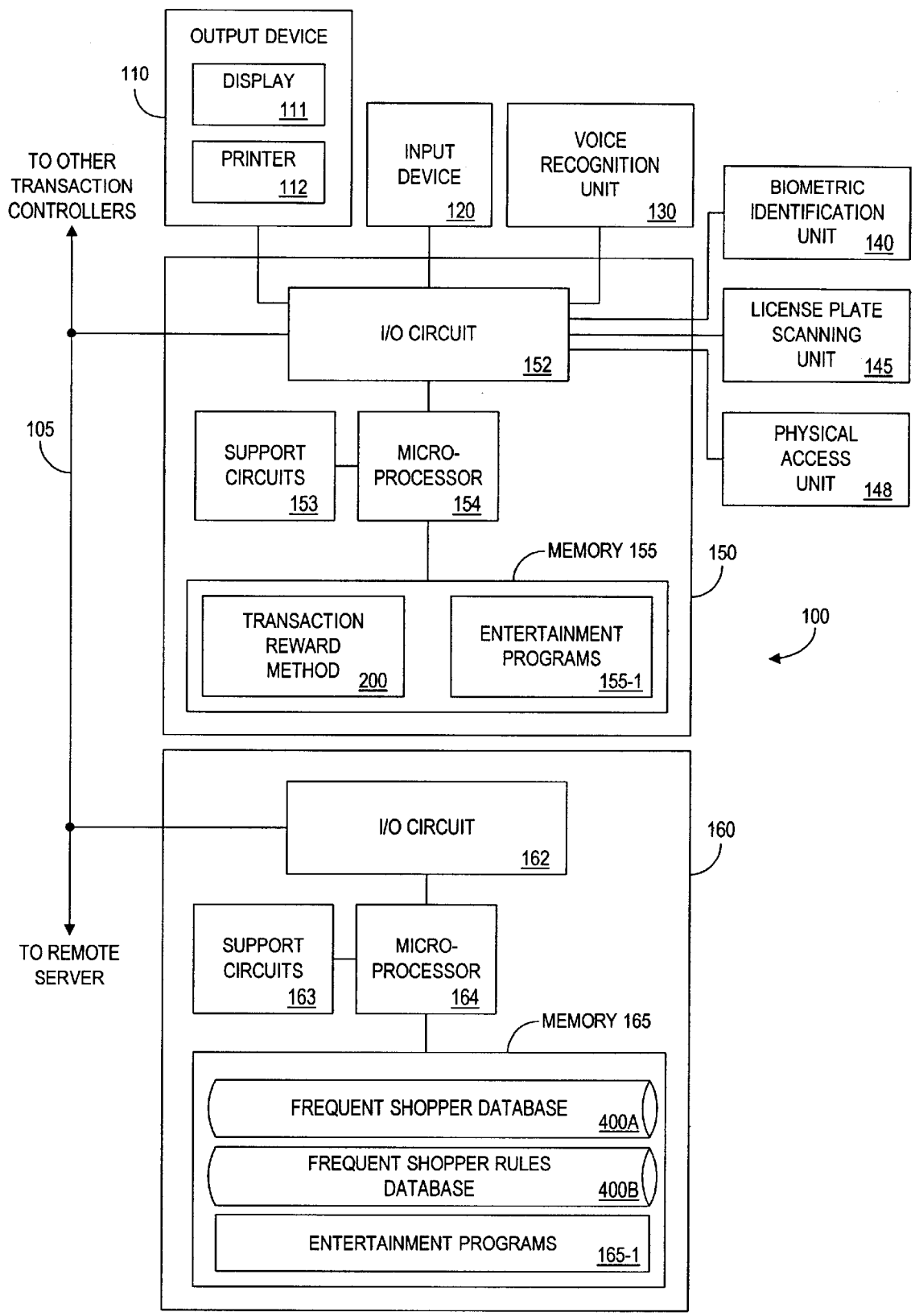
FIG. 1 depicts a block diagram of a transaction system according to one embodiment of the invention.

FIG. 1 depicts a block diagram of a transaction system according to one embodiment of the invention. Specifically, FIG. 1 depicts a block diagram of a transaction system 100 suitable for transacting with consumers or shoppers utilizing a frequent shopper card within, e.g. a shopping environment such as a fast food restaurant.

The system 100 includes a transaction controller 150, an output device 110, an input device 120, a server 160, an optional voice recognition unit 130, an optional biometric identification unit 140, an optional license plate scanning unit 145 and an optional physical access unit 148. Those skilled in the art will understand that the voice recognition unit 130 and the biometric identification unit 140 may be the same device. For example, the biometric identification device 140 may read and interpret signals representing a person's voice, and thereby determine if the person is to be granted access. Also, those skilled in the art will understand that the biometric identification device 140 may be a handwriting recognition and identification device, such as those supported by Advanced Recognition Technologies Inc's smARTwriter® software.

The transaction controller 150, illustrative of a point of sale (POS) terminal within a transactional environment such as a restaurant, comprises an input/output (I/O) circuit 152, support circuitry 153, a microprocessor 154 and memory 155. The microprocessor 154 cooperates with conventional support circuitry 153 such as power supplies, clock circuits, cache memory and the like as well as circuits that assist in executing the various software routines. The transaction controller 150 also contains input/output circuitry 152 that forms an interface between the transaction controller 150 and the display device, the input device 120, the server 160 and the various optional units 130–148. Although the transaction controller 150 is depicted as a general purpose computer that is programmed to perform specific functions in accordance with the present invention, the invention can be implemented in hardware as an application specific integrated circuit (ASIC). As such, the process steps described herein are intended to be broadly interpreted as being equivalently performed by software, hardware, or a combination thereof.

The output device 110, illustratively a computer or video display device 111 or a printer 112, is operatively coupled to the transaction controller 150 and displays information to, e.g., a store clerk and/or a transacting customer. The input device 120, illustratively a keyboard or pointing device, is operatively coupled to the transaction controller 150 and receives information from, e.g., a store clerk and/or a transacting customer. The display unit 111 and input unit 120 may be combined into a single functional unit comprising, e.g., a touch screen device.

The server 160, illustratively a central computer or server within a transactional environment such as a restaurant, comprises an input/output (I/O) circuit 162, support circuitry 163, microprocessor 164 and memory 165. The input/output (I/O) circuit 162, support circuitry 163, a microprocessor 164 and memory 165 function in substantially the same manner as, respectively, the input/output (I/O) circuit 152, support circuitry 153, a microprocessor 154 and memory 155 described above with respect to the transaction controller 150. The server 160 is operatively coupled to the transaction controller 150 via a communications link 105, illustratively a local area network (LAN). In the case of a remotely located server (not shown), the communications link 105 may comprise, e.g., a wide area network (WAN) or Internet communications channel.

The memory 155 of the transaction controller 150 is depicted as including a transaction reward method 200. The transaction reward method 200 will be described in more detail below with respect to FIG. 2. Briefly, the transaction reward method 200 operates in conjunction with the input devices (i.e., input device 120 and optional voice recognition unit 130, biometric identification unit 140 and license plate scanning unit 145) and output devices (display unit 111 and optional physical access unit 148) to transact with a shopper or consumer using a frequent shopper card. An identifier that identifies the transacting consumer associated with the frequent shopper card (i.e., the account member), and information pertaining to that consumer, are stored in a frequent shopper database 400A within, e.g., server 160. Additionally, the transaction reward method 200 assesses reward points based upon transaction parameters defined within a frequent shopper rules database 400B within, e.g., server 160. It will be appreciated by those skilled in the art that the transaction reward method 200 may be stored in memory 155 of transaction controller 150, memory 165 of server 160 or another remote memory location. All that is necessary is that the transaction reward method 200 be operably engaged with the various devices used to transact with a consumer or frequent shopper card holder.

The memory 165 within the server 160 is depicted as including a frequent shopper database 400A, a frequent shopper rules database 400B and, optionally, entertainment programs 165–1. The frequent shopper database 400A and frequent shopper rules database 400B will be described in more detail below with respect to FIG. 4A and FIGS. 4B and 4C, respectively. Additionally, a relationship between the objects within the frequent shopper database 400A and a transaction will be described in more detail below with respect to FIGS. 3A–3C. Briefly, the frequent shopper database 400A comprises a plurality of data objects indicative of the type and membership of a frequent shopper account, including demographic profile data, transaction profile data, reward level and other information associated with each member. The frequent shopper rules database 400B comprises a plurality of data objects indicative of the rules defining the reward level or reward points assessed to a frequent shopper account in response to a transaction or series of transactions. For example, the frequent shopper rules database defines how many members must be present, the minimum value of a transaction to earn a reward and other parameters. frequent shopper account, including demographic profile data, transaction profile data, reward level and other information associated with each member. The frequent shopper rules database 400B comprises a plurality of data objects indicative of the rules defining the reward level or reward points assessed to a frequent shopper account in response to a transaction or series of transactions.

For example, the frequent shoppers rules database defines how many members must be present, the minimum value of a transaction to earn a reward and other parameters.

The above-described databases may be centrally stored or, in another embodiment, may be stored on the card itself. For example, the data may be stored in memory on a smart card, encoded on a magnetic strip on a card or stored in the cache or "cookie" on a computer of the customer (e.g. a PDA).

The optional biometric identification unit 140 may comprise any device useful in identifying a human being. For example, the biometric identification unit 140 may comprise a fingerprint scanner, a voice recognition unit or voice signature unit, a retinal scanning unit or any other device suitable for identifying a human. The biometric identification unit 140 is used as a means of allowing the transaction controller 150 to assure that a particular member or sub-account holder associated with the frequent shopper card is actually present. In the case of a transaction environment in which the actual identity or membership status of a present customer is immaterial to a particular transaction, then the biometric identification unit 140 may be used to provide a mere indication that a specific person is present, rather than providing identification information about that person. Thus, the type of biometric identification unit 140 utilized may be dependent primarily on non-technical factors, such as the marketing objectives of a transacting establishment. For example, in one embodiment of the invention it is only necessary to determine that a person has traversed (or will traverse) a physical access point such as a public transit turnstile, so that the value (cost and/or reward) of such access is attributed to a particular frequent shopper card.

The optional voice recognition unit 130, which may function as a biometric identification device, comprises, illustratively, a voice recognition unit (e.g., voice signature unit), audio analyzer or voice stress analyzer, depending upon the purpose of the voice recognition unit 130. For example, if the voice recognition unit 130 is used to determine whether a particular individual is present, then the voice recognition unit may be a relatively sophisticated hardware or software apparatus used to identify a number of vocal characteristics such that a voice profile or signature may be derived and matched to a stored signature, thereby identifying a particular person. If the voice recognition unit 130 is used merely to count the number of people in a party, then the unit may be a less sophisticated apparatus designed merely to identify differences in voice patterns or spatial differences in voice or audio sources. Optionally, the voice recognition unit 130 may comprise a voice stress analyzer that may be used, e.g., as a marketing tool to help identify whether the speaker is having a pleasant transaction experience or whether the transaction environment should be adapted in some way to reduce the stress level of the transacting parties.

The optional physical access unit 148, comprises, illustratively, a gate at a members-only "warehouse" store (or other members-only establishment such as a child-friendly restaurant/play center), a public transit turnstile or any type of physical barrier through which physical access may be gained. The use of a frequent shopper card (i.e., a frequent rider card in a public transit system) within a physical access transaction environment may require that a primary account member transact for all present sub-account members prior to gaining physical access to, e.g., a train platform.

A. General Transaction Environment

Figure 3A:
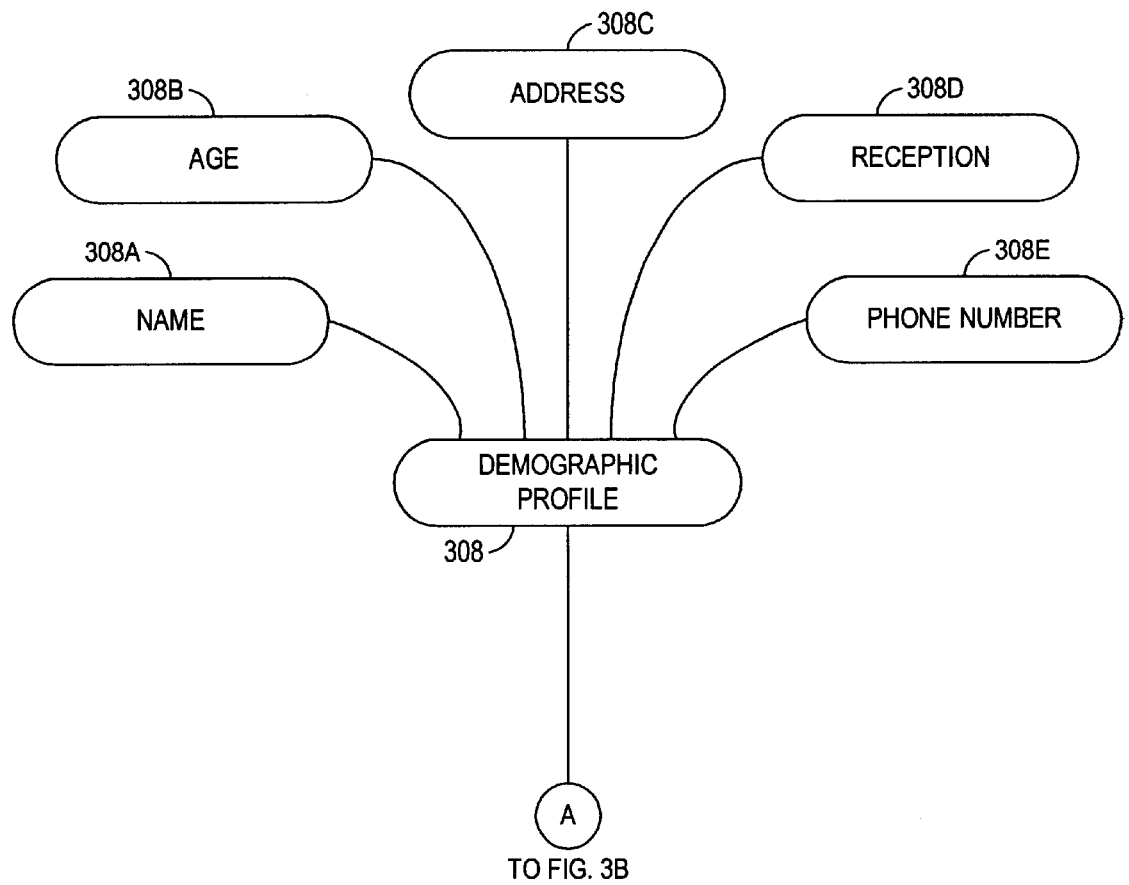
FIGS. 3A–3C depict a relational diagram useful in understanding the present invention.
Figure 3B:
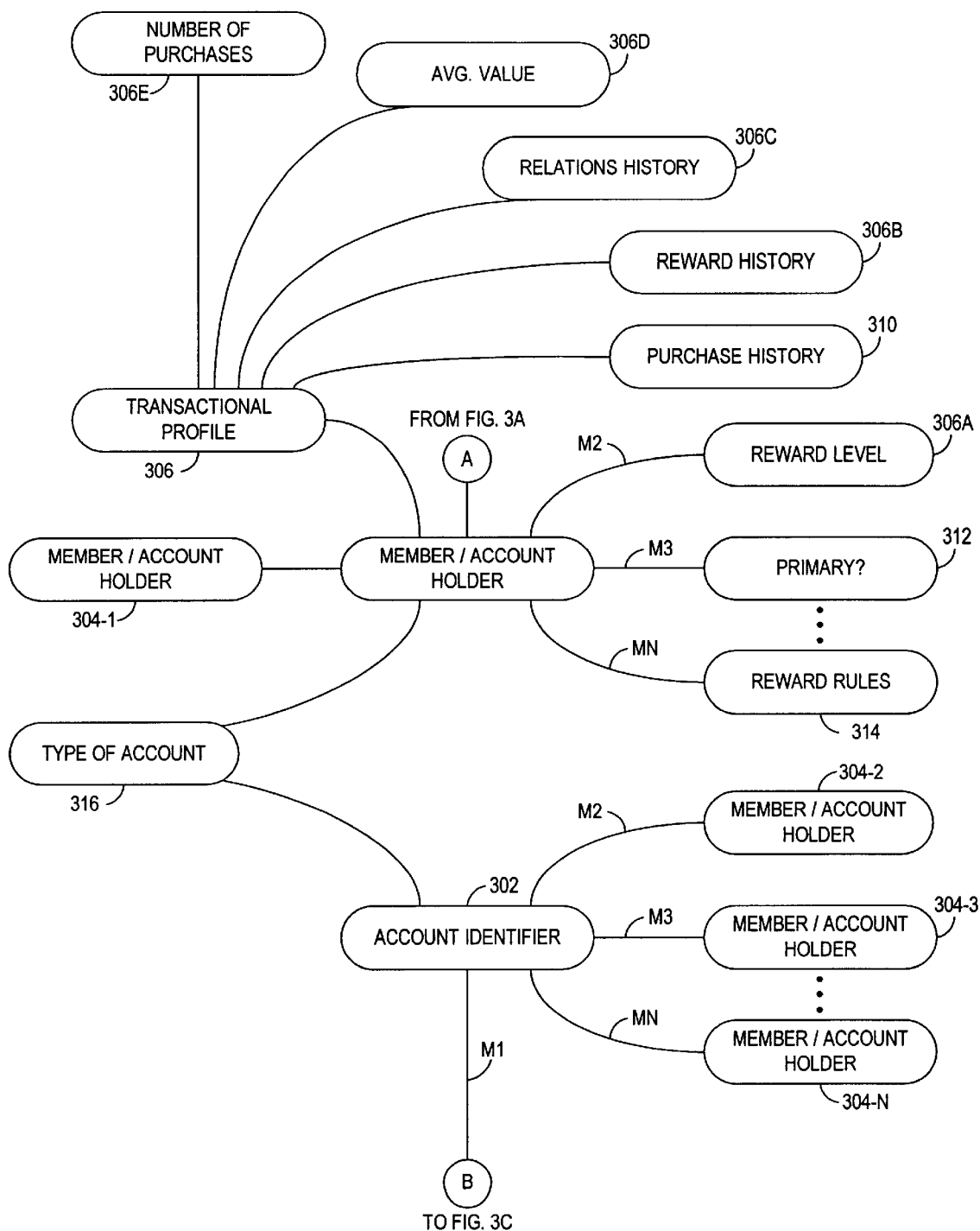
Figure 3C:
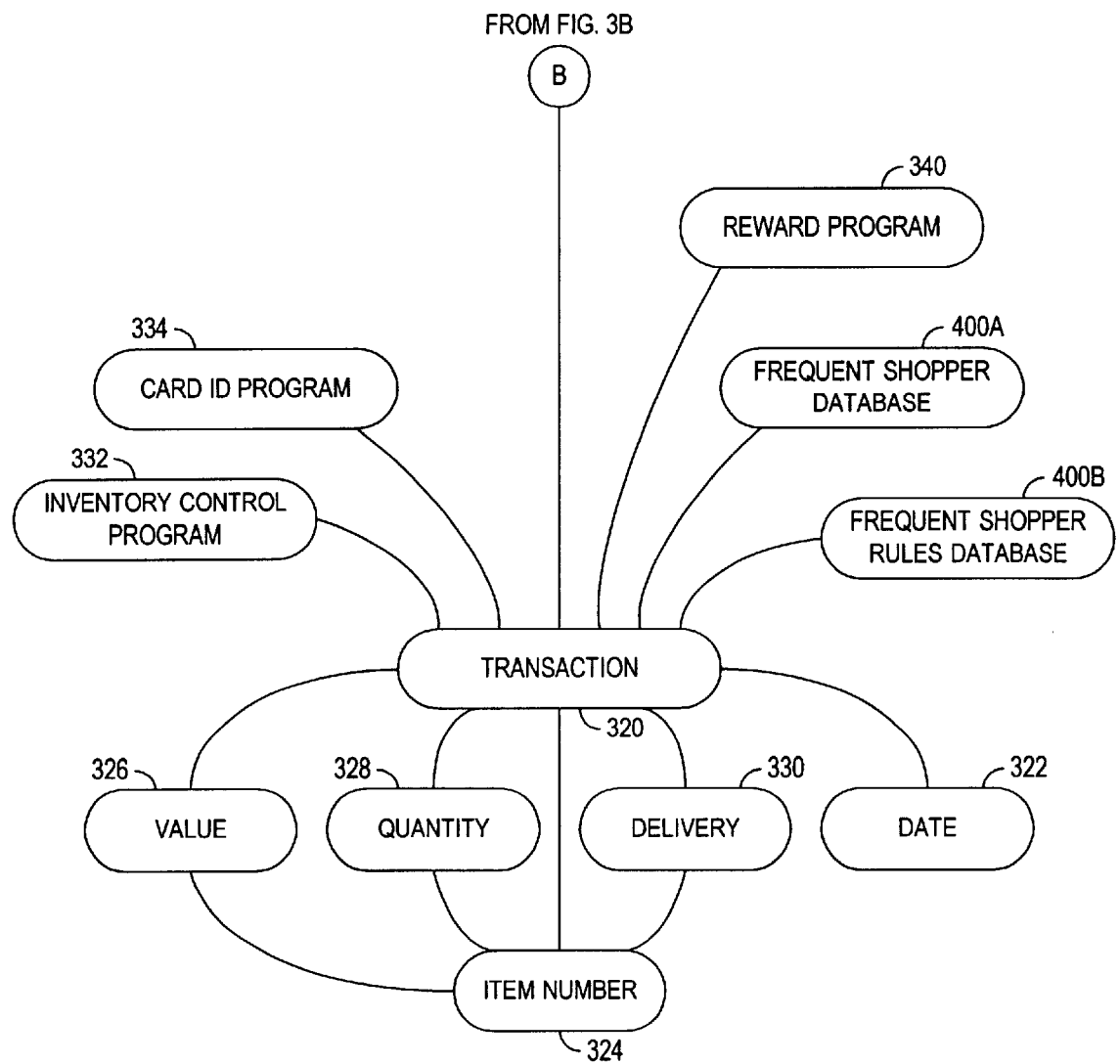

FIGS. 3A–3C depict a relational diagram useful in understanding the present invention. Specifically, FIGS. 3A–3C depict a relational diagram of transaction-related elements or objects utilized in an embodiment of the present invention.

A frequent shopper reward system according to the invention provides a single account that may be associated with a plurality of sub-account holders or members. Referring to FIG. 3B, the single account is identified by an account identifier 302. The account identifier 302 is associated with a plurality of account members 304-1, 304-2, 304-3 and 304-N.

Each of the account members or account holders 304-1 through 304-N is associated with a plurality of respective data objects. Specifically, referring now to account holder 304-1, an exemplary grouping of account holder data objects comprises the following: a transactional profile 306, a demographic profile 308, a reward level 310, a primary member or account holder indication field 312, a reward rules field 314 and an account type field 316. Each account member or account holder 304 and the respective data objects 306-3 16 are stored in a frequent shopper database 400A, which will be described in more detail below with respect to FIG. 4A.

The transactional profile 306 contains information relating to prior transactions by the account member 304. Specifically, the transactional profile 306 comprises a purchase history 306A, a reward history 306B, a relations history 306C, an average value indicator 306D and a number of purchases indicator 306E. The purchase history 306A comprises a list of some or all of the purchases and/or transactions associated with the account member or sub-account holder 304. The reward history 306B comprises a listing of some or all of the rewards earned and/or redeemed by the account member or sub-account holder 304 relating to, e.g., the purchases or transactions identified within the purchase history 306A. The relations history 306C includes historical data tracking the various relations between the account member or sub-account holder 304 and other account members or sub-account holders associated with account identifier 302 or, optionally, other accounts (e.g., a frequent shopper participating in several programs offered by the same or different promoters). The average value indicator 306D represents the average value of an item or the average value of a transaction associated with the account member or sub-account holder 304. The number of purchases indicator 306E indicates the number of discrete transactions entered into by the account member or sub-account holder 304.

The demographic profile 308 comprises information relating to the account member or sub-account holder. Specifically, the demographic profile 308 includes the name 308A, age 308B, address 308C, relation 308D, and phone number 308E of the account member or sub-account holder 304. Other demographic information may be included in this profile, such as member entered information indicative of member preferences, information derived from data mining or other processing techniques and the like.

The relation object 308D represents a present or historic relationship between this account member or sub-account holder 304-1 and other account members or sub-account holders exhibiting similar demographic profiles and/or tendencies. For example, through the aforementioned data mining techniques, it may be determined that a particular member or account holder 304-1 exhibits demographic or transactional tendencies associated with other members or account holders from the identified account 302 or other accounts. By maintaining an active link between demographically similar account members or sub-account holders, regardless of actual account, it is possible to formulate incentive programs tailored to particular demographic groupings, regardless of the account affiliation of a particular member.

The reward level object 310 indicates a present reward level of the account member or sub-account holder 304. The reward level may be determined as, e.g., a number of reward points earned.

The primary holder indicative object 312 indicates whether the particular account member or sub-account holder 304 is a primary member or primary account holder (e.g., a parent or head of household on a restaurant frequent purchaser card having a plurality of children as sub-account holders).

The reward rules object 314 indicates whether any specific reward rules are applicable to the account member or sub-account holder 304 beyond those included in a frequent shoppers rules data base 400B, which will be discussed in more detail below with respect to FIG. 4B. For example, to encourage account usage by new members, points or rewards accrued by a new member may be enhanced (e.g., doubled) for an introductory period (e.g., six months). Similarly, a predefined affinity card or program selected by the member or sub-account holder 304-1 may impose particular reward rules regarding the accrual of "co-reward" points for the two programs. For example, an affinity frequent flyer program associated with the account identified 302 and the member or sub-account holder 304-1 may require the purchase of certain items (e.g., garment bags, travel kits and the like) at certain minimum value or cost levels before affinity reward points (e.g., frequent flyer miles) are awarded to the member or account holder 304-1.

In addition to being associated with one or more members or sub-account holders 304-1 through 304-N, the account identifier 302 of FIG. 3 is associated with a type of account object 316, and a present transaction 320. The type of account object 316 indicates whether the account is a single user account or multiple user account. Optionally, the type of account object 316 may be used to indicate whether the account is associated with affinity accounts, a particular termination date, and other such information.

The transaction 320 is associated with, for each item sold, a transaction date 322, an item number 324, an item value 326, an item quantity 328, an item delivery term 330 and, optionally, an inventory control system program 332. It must be noted that FIGS. 3A–3C depict a single item 324 related to a single transaction 320 that is associated with the account identifier 302. It will be appreciated by those skilled in the art that the transaction 320 may be associated with multiple items having associated item number, value, quantity and delivery terms. Moreover, it will be appreciated by those skilled in the art that the identified account 302 may be associated by multiple transactions, each of which may involve one or more items and other associated information.

The transaction data 322 indicates the date upon which a particular transaction 320 is consummated. The item number 324 indicates a particular item that is purchased by a member or sub-account holder 304 of the account 302. The item value term 326, item quantity term 328 and item delivery term 330 are those contractual terms associated with the purchase of the item 324 during the transaction 320. It is noted that a typical inventory control program seeks to keep in stock a minimal number of items necessary to satisfy consumer demand, while avoiding the maintaining in inventory of more items than are necessary. That is, an inventory control program typically seeks to reduce costs and enhance customer satisfaction by carrying the minimum level of inventory needed to substantially satisfy consumer expectations of immediate or near term delivery of purchased items. Various demand flow and value chain programs and techniques are available to perform this task and may be operatively coupled to the invention.

The transaction 320 is associated with a card identification program 334, a frequent shoppers data base 400A, a frequent shoppers rules database 400B and a reward program 340. The card identification program 334 comprises a program that reads or otherwise determines the account identifier associated with a frequent shopper card. The card identification program may comprise hardware and/or software suitable for reading a magnetic card, interfacing to a smart card, scanning a license plate to identify a vehicle belonging to a member or account holder 304-1, identifying a particular present human being using a voice recognition unit 130, a biometric identification unit 140 or retrieving an account identifier via any input means such as a keyboard or pointing device.

The frequent shoppers database 400A contains information associated with frequent shoppers (i.e., members/account holders) as previously described with respect to the member or account holder 304-1. That is, the frequent shoppers database 400A may comprise a centralized database that stores information associated with all frequent shoppers participating in a particular frequent shopper program or promotion. The frequent shopper's rules database 400B comprises a database that provides all the rules associated with a particular frequent shopper program or promotion that are applicable to all participants in that program. The frequent shoppers rules database 400B may also include those rules associated with particular members or account holders (i.e., reward rules 314 as described above), such that a centralized relational database may be used to store all shopper and rules information. The frequent shoppers database 400A and frequent shoppers rules database 400B are used with in the context of a transaction 320 to assess reward points based upon the transaction itself and appropriately credit those reward points to the proper member's or account holder's account. The reward program 340 is used to determine the actual reward level associated with a particular transaction. For example, a transaction having a monetary value of $100 may be assessed, e.g., on e hundred points and in t he case of an affinity frequent flyer program, an additional one hundred frequent flyer miles. The frequent shopper rules database 400B will be described in more detail below with respect to FIGS. 4B and 4C.

Figure 4A:
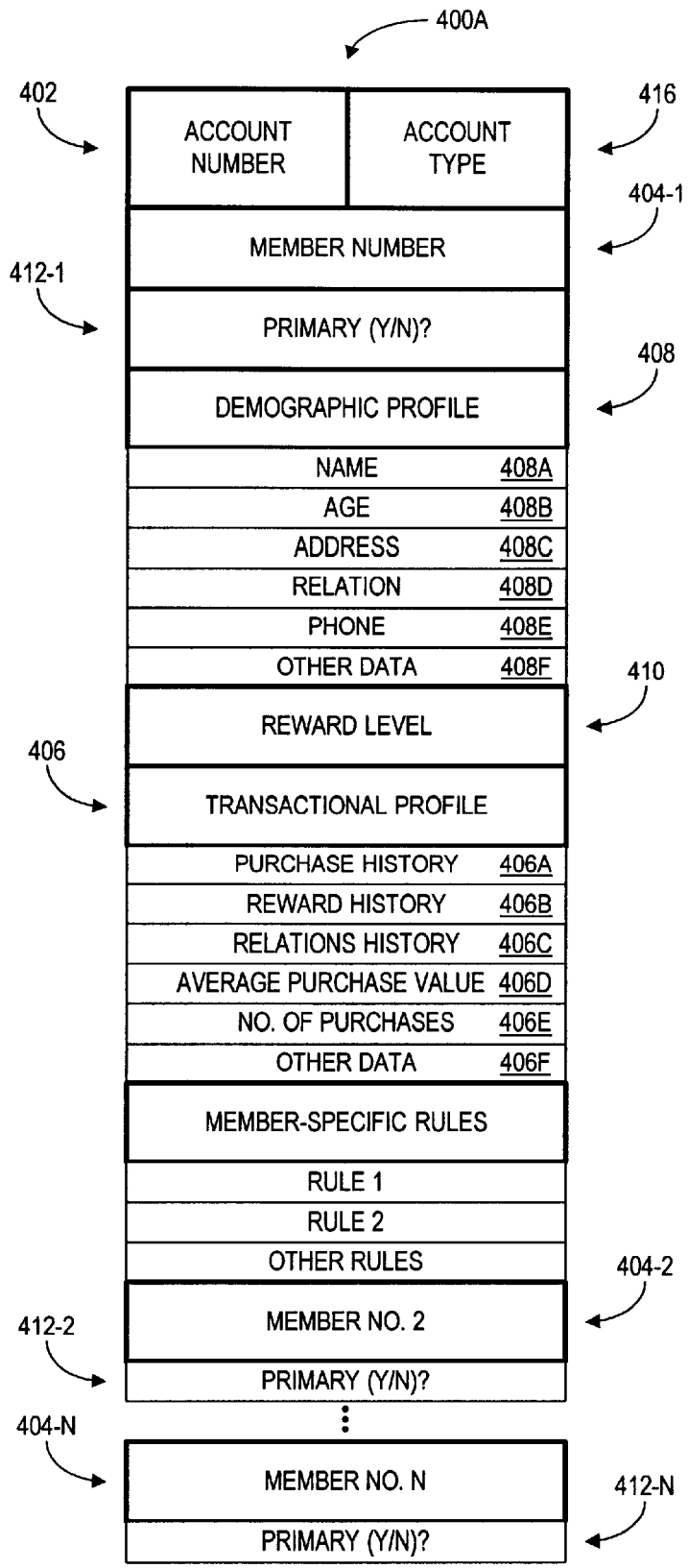
FIG. 4A depicts an exemplary frequent shopper database in tabular form and suitable for use in the transaction system of FIG. 1.

FIG. 4A depicts an exemplary frequent shopper database 400A in tabular form. The frequent shopper database 400A of FIG. 4A comprises a subset of the information previously described with respect to FIGS. 3A–3C. Specifically, the frequent shopper database 400A as depicted in FIG. 4A comprises a tabular presentation of the information related to member or account holder information 304 of FIG. 3B. That is, the account identifier 302, member or account holder 304, primary member indicator 312, demographic profile 308, transactional profile 306, reward rules 314 and type of account object 316 of FIG. 3B correspond to, respectively, account identifier 402, member or account holder 404, primary member indicator 412, demographic profile 408, transactional profile 406, reward rules 414 and type of account object 416 of FIG. 4A.

Since each of these corresponding data objects, and any corresponding sub-objects, operate in substantially the same manner as described above with respect to FIGS. 3A–3C, the corresponding data objects and sub-objects of FIG. 4A will not be discussed in further detail.

FIGS. 4B and 4C depict an exemplary frequent shopper rules database 400B. The rules database 400B is divided into physical presence rules 450, transaction rules 460, reward rules 470 and affiliation rules 480. The physical presence rules 450 refer to the physical presence requirements imposed upon a transacting member or members prior to the earning of a reward. The transaction rules 460 refer to the type of item purchased, value of items purchased and other parameters associated with a reward-earning transaction. The affiliation rules 480 (e.g., a co-brand reward "kicker") are associated with rules governing transactions that are also associated with an affiliated promotion or program, rules governing co-promotion reward calculation, reward assessment and promoted payment means (i.e., affinity credit cards, preferred bank credit cards and the like).

In the exemplary embodiment of FIG. 4B, the physical presence rules 450 comprise a first field indicative of whether the presence of a member is required prior to the member receiving a reward; a second field AAA indicative of a number of members required to be present prior to a reward being earned; a third field indicative of whether a primary member must be present to earn a reward (for those accounts utilizing a primary member or account holder) and other physical presence rules.

In the exemplary embodiment of FIG. 4B, the transaction rules 460 comprise a first field indicative of a minimum total transaction value BBB required to be reached prior to earning a reward. A second field defines a list of enhanced value transaction items (ER1–ERx), that is a list of items that are associated with an enhanced reward value. A third field defines a list of degraded value transaction items (DR1–DRx), that is a list of items that are associated with an degraded reward value. A fourth field defines a list of required transaction items (ER1–ERx), that is a list of items that are associated with a required reward value. A fifth field defines a time of day promotion, e.g., "early bird special." A sixth field defines a day of the week promotion, e.g., a promotion to boost sales on a traditionally low-volume day. A seventh field defines a frequency of transaction promotion, e.g., the minimum number of visits within a pre-defined time period a primary of sub-account holder must make, such as four visits per month. An eighth field is used to define other transaction rules.

It should be noted that enhanced reward items are those items that, when purchased, earn a reward level above the level or points normally awarded to an item of similar transaction value, e.g., promotional items, clearance items, slow moving items and the like. Similarly, degraded reward items are those items that, when purchased, earn a reward level below the level or points normally awarded to an item of similar transaction value, e.g., items that are in short supply or so highly prized by consumers that no reward is necessary to provide a consumer incentive, such as the most popular new toy at Christmas. Finally, required reward items are those items that must be purchased prior to a transaction being able to generate a reward.

In the exemplary embodiment of FIG. 4B, the reward rules 470 comprise a first field that defines reward accrual rules, such as how many reward points must be earned prior to redemption of the points for a reward. A second field defines reward tier rules, such as disproportionately increasing redemption values as reward levels increase beyond various threshold levels or tiers. A third field defines reward allocation rules, such as whether a primary account member or holder is entitled to a preferential allocation of reward points. A fourth field defines the type of rewards that may be provided, such as present or future transaction discounts, merchandise or service coupons, "cash back" allowances, frequent flier miles, long distance telephone call discounts or free minutes and the like. A fifth field is used to define other reward rules and rewards. In one embodiment, the reward points allocated to the primary account holder and the sub-account holders may vary depending on the total number of account and sub-account holders in the transacting party. For example, for a given transaction, ten points may be allocated to the primary account holder if no other sub-account holders are present. But twenty points may be allocated to both the primary account holder and a sub-account holder if both are physically present for the transaction.

In the exemplary embodiment of FIG. 4C, the affiliation rules 480 include a first field defining a reward point increase attributed to a transaction that includes the use of a credit card from a particular bank. A second field defines a reward point increase attributed to a transaction that includes the use of a store credit card. A third field is indicative of whether the transaction reward program includes an automatic link to a frequent flier program (e.g., transaction reward points redeemable as frequent flier miles). A fourth field is indicative of whether the transaction reward program includes an automatic link to an affiliated reward program. A fifth field is used to define other affiliation rules.

In one embodiment of the invention the members or account holders are divided into a plurality of classes, where each class is associated with a respective reward structure. Class membership denotes a particular demographic or transactional profile (or set of profiles) that is associated with an appropriately tailored reward structure. Classes may be defined in any manner appropriate for the transaction environment. For example, in the case of a restaurant transaction, environment classes may comprise adults, children, high value purchasers, high volume purchasers, expense account users, vegetarians and the like. The reward structure associated with each class provides at least an incentive appropriate to a member of that class. Optionally, the reward structure also provides additional incentive to that member to purchase higher quality, higher volume or other products or services targeted by a merchant.

The reward structure associated with a respective class is adapted to the transaction or demographic profile appropriate to that class. For example, in the case of membership in the high value purchaser class, the associated reward structure may emphasize high value item rewards, luxury affinity program tie-ins and other incentives appropriate to encourage purchases by a member of that class. In the case of membership in the expense account user class, the reward structure may include a corporate reward component and a personal reward component. The corporate reward component provides an incentive to the corporation to utilize the products and/or services being purchased (advanced or detailed expense account tracking, pooling of rewards or discounts with other corporate users, corporate cash-back and the like), while the personal reward component provides a more a direct incentive to the expense account user (e.g., frequent flyer add-ons, luxury upgrades and other enhancements of a more personal nature).

Class membership is determined with respect to a transaction profile or demographic profile. The transaction or demographic profile may evolve over time such that a member or sub-account holder will migrate from one class into another class. This class migration occurs in response to actual changes in the transaction or demographic information associated with the member or account holder. Additionally, this migration occurs in response to refinements in the accuracy of the transaction or demographic profile associated with the member or account holder. In either case, the system continually updates and refines the information related to each member or account holder. In this manner, the reward structure associated with that member or account holder is refined in a manner likely to induce loyalty in that member or account holder to the products and/or services offered by a participating merchant.

B. Retail Store Transaction Environment

An embodiment of the subject invention will now be described within the context of a retail store environment. The retail store environment may comprise, e.g., a restaurant, a department store, a movie theater or any other retail establishment selling products and/or services. The present invention allows a frequent shopper card 5 associated with a single customer to be used during a retail transaction to identify a plurality of sub-account holders or members and update performance data associated with the sub-account holders or members according to the transaction or transactions performed.

For purposes of this discussion it will be assumed that a primary account holder or primary member having physical control of a frequent shopper card is a head of a household (i.e., a parent) comprising five members. In the retail store environment the parent presents his or her frequent shopping card to the clerk operating the transaction controller 150, i.e., a point of sale terminal. The clerk "scans" or "swipes" the frequent shopper card using a card reader or other input device 120 suitable for entering the frequent shopper card data into the transaction controller 150. The transaction controller 150, in response to the entry of an account identifier via input device 120, retrieves the account data associated with the frequent shopper account. The transaction controller 150, in response to the retrieved account information, prompts the clerk or primary account holder to identify all present sub-account holders. That is, a prompt may be issued directly by the transaction controller 150 via, e.g., a display device 110, to indicate to either of the clerk or primary account holder which sub-account holders or members are physically present. This prompt may be communicated in several ways. For example, the prompt may be communicated directly to the parent or primary account holder via display 110, illustratively a touch screen. The prompt may be communicated indirectly by outputting a "check-off" list to a screen read by the clerk, who would then verbally ask the parent or primary card holder which sub-account holders are present. The card holder would then input the number and/or identity of those present according to the response provided by the parent or primary account holder.

After determining which sub-account holders are present, the transaction controller 150 processes the transaction or transactions of the present account holders or members. After processing the instant transaction(s), the transaction controller 150 evaluates the transaction(s) based upon, e.g., subtotal, particular items purchased, presence of sub-account holders and other data as defined by the various rules within the frequent shopper rules database 400B. The rules may specify, for example, a minimum purchase amount (e.g., greater than $50), that at least one of a particular item must be purchased, that greater than a predetermined number of sub-account holders must be present, or that a particular form of payment must be used (i.e., a credit card from an affiliated or participating bank or credit union). Based upon the evaluation of the transaction in accordance with the reward rules, the account and/or sub-account holder performance data is updated by, e.g., adding or subtracting reward points.

Figure 2:
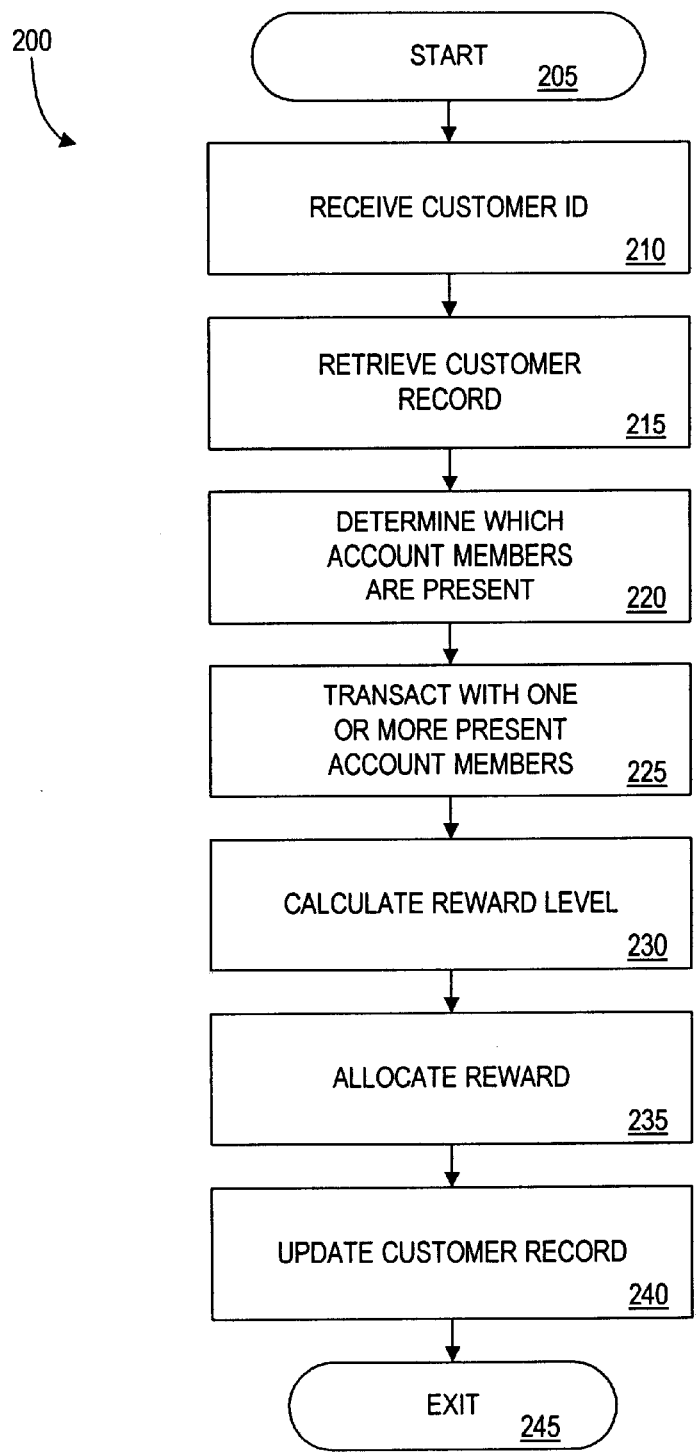
FIG. 2 depicts a flow diagram of a transaction reward method according to the invention.

FIG. 2 depicts a flow diagram of a transaction reward method 200 according to the invention. Specifically, FIG. 2 depicts a flow diagram of a method 200 for transacting and assessing reward points to a plurality of members using a common account or frequent shopper card.

The method 200 is entered at step 205 and proceeds to step 210, where a customer ID is received. A customer ID may be received by, e.g., swiping or otherwise inputting into the transaction controller 150 the account identification information from a frequent shopper card. The method 200 then proceeds to step 215, where the customer record associated with the received account identification are retrieved from, e.g., the store server 160 or a remote server (not shown). The method 200 then proceeds to step 220.

At step 220 a determination is made as to which account members are physically present at the transaction point. For example, in the case of a frequent customer club at a restaurant, a determination is made as to which members are present in the restaurant. This determination may be made in several ways, as previously described. The determination may be made by a verbal query from the clerk or wait person to primary member account holder. The method 200 then proceeds to step 225. At step 225 a transaction between one or more of the present account members and the transaction controller 150 is consummated. For example, in the case of the frequent customer card, a transaction may comprise of a selection of foods and beverages coupled with payment or a promise to pay for those selected foods and beverages. The method 200 then proceeds to step 230.

At step 230 a reward level is calculated based upon the transaction performed at step 225, the number and/or identification of the present numbers determined at step 220 and any additional reward level parameters. For example, in the case of a frequent customer card having an enhanced reward period for new frequent dining program members, the reward level calculated at step 230 may be enhanced in some manner. The method 200 then proceeds to step 235.

At step 235, the calculated reward level is allocated to one or more of the account members. The reward may comprise an increase in reward points that is allocated evenly between the present members, allocated in a preferential manner to a primary member with non-primary members (i.e., sub-account holders) receiving a smaller portion or in any other manner. The reward may comprise an immediate discount on the cost to the member(s) of the transaction performed at step 225, a future discount, a coupon, a monetary rebate (i.e., a "cash back" program) or other reward. In the case of coupons, the transaction controller 150 may produce, via a printing device 112, an appropriate coupon. The method 200 then proceeds to step 240, where the customer record is updated, and to step 245 where the method is exited.

With respect to step 220 of the method 200 of FIG. 2, the inventors contemplate several methods for determining which account members are present. A first method comprises the verbal prompting of, e.g., the primary member or account holder by, e.g., a clerk within a transaction environment such as a store. The clerk optionally is provided a list via a display device of the members of the frequent shopper account. Each of the members or sub-account members may verbally indicate to the clerk their name, the clerk may simply count the number present and assume all the people present are related to the frequent shopper account, or the people in the party may enter their initials, thumbprints, or some other identifier into the transaction controller 150 via, e.g., biometric identification unit 140.

Figure 7:
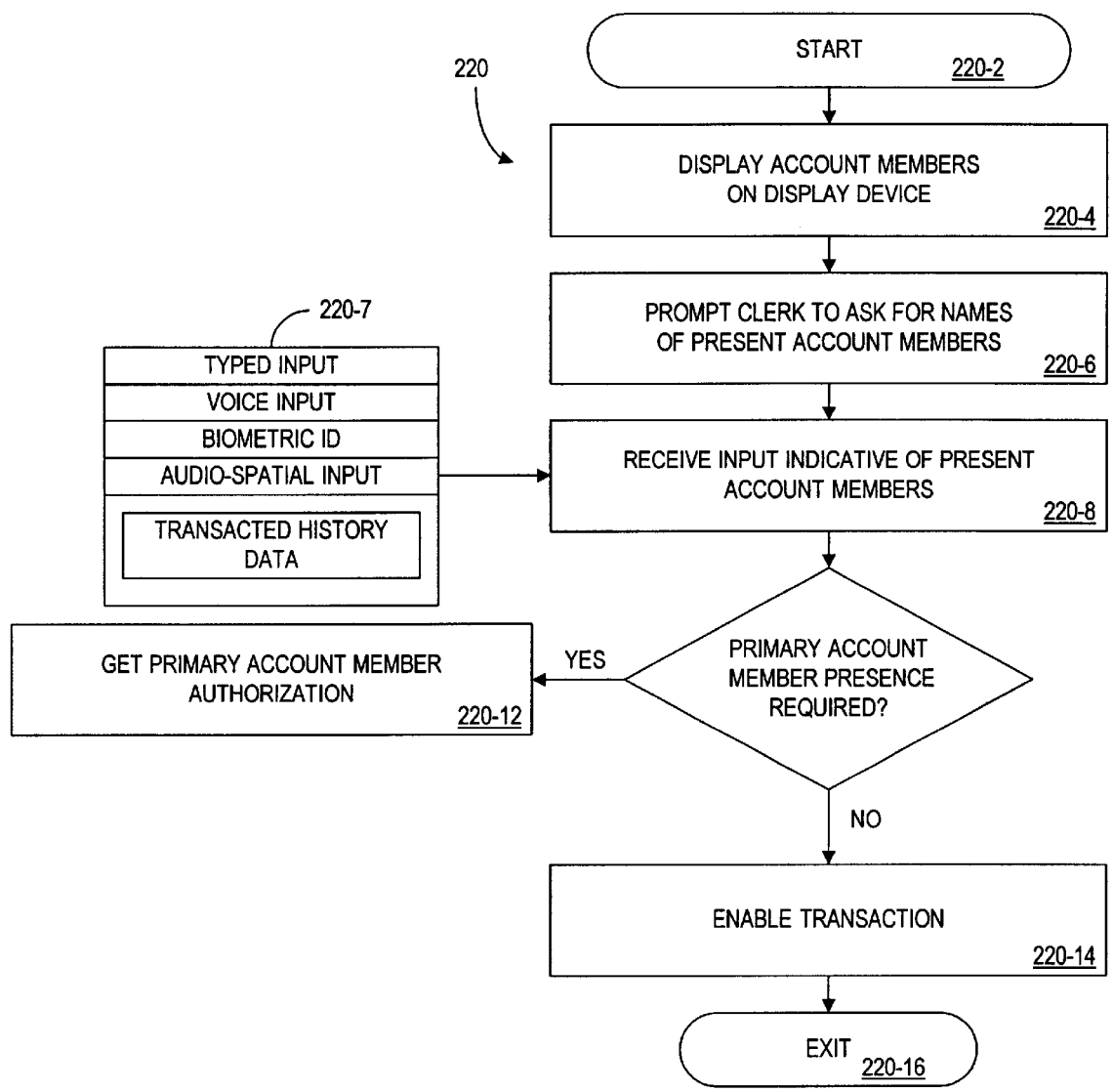
FIG. 7 depicts a flow diagram of a present member determination method suitable for use in the method of FIG. 2.

FIG. 7 depicts a flow diagram of a present member determination method 220 suitable for use in the method 200 of FIG. 2. Specifically, FIG. 7 depicts a method 220 suitable for use in implementing step 220 of the method 200 of FIG. 2.

The method 220 is entered at step 220-2 and proceeds to step 220-4, where the account members associated with the transacting account are displayed on a display device, e.g., display unit 110. The method 220 then proceeds to optional step 220-6.

An optional step 220-6 a prompt is issued to a clerk requesting that the clerk ask for the names of present account members from a customer transacting with the clerk. The method 220 then proceeds to step 220-8.

At step 220-8 input indicative of the present account members is received. For example, in the case of optional step 220-6 being utilized, a clerk may type or otherwise input into the transaction controller the names of the present account members as indicated by the customer. Similarly, the present account members may indicate their presence in any one of several means.

As indicated by task 220-7, the input may comprise typed input, voice input, biometric identification, and /or audio-spatial input. Additionally, it must be noted that the input step may be performed after transaction items are determined by comparing the transaction items with transaction history data to determine whether one or more account members are present and, if so, which sub-account members are likely present as well.

Referring to input step 220-7, the typed input may comprise customer or clerk input to the transaction controller 150 via a touch screen, a keypad or a pointing device. Voice input may be provided via the voice recognition unit 130. The biometric identification may be provided via biometric identification unit 140. Audio-spatial input may be provided via voice recognition unit 130 or biometric identification unit 140. The audio spatial input comprises audio information sufficient to allow the transaction controller to determine the number of audio sources. For example, in the case of an enclosed area, such as a vehicle including several potential account members, the audio spatial information may comprise each of the members stating their names or the fact that they are present. The transaction controller 150 processes the audio information to determine how many audio point sources are provided, thereby providing an indication as to the number of people in the vehicle and, presumably, the number of account members present. The method 220 then proceeds to step 220-10.

At step 220-10 a query is made as to whether a primary account member must be present to transact on the account. That is, a query is made as to whether a contemplated transaction requires authorization for the physical presence of a primary account member. If the query at step 220-10 is answered affirmatively, then the method 220 proceeds to step 220-12. If the query at step 220-10 is answered negatively, then the method 220 proceeds to step 220-14.

At step 220-12 the primary account member authorization is retrieved. The primary account member authorization may be inferred based upon the presence of a primary account member or an additional personal identification number (PIN) associated with the primary account member. Upon retrieval of the primary account member authorization, the method 220 proceeds to step 220-14. If primary account member authorization is not received, then the method 220 times out and the transaction is aborted.

At step 220-14 the transaction is enabled. The method 220 then proceeds to step 220-16 where it is exited.

Figure 6A:
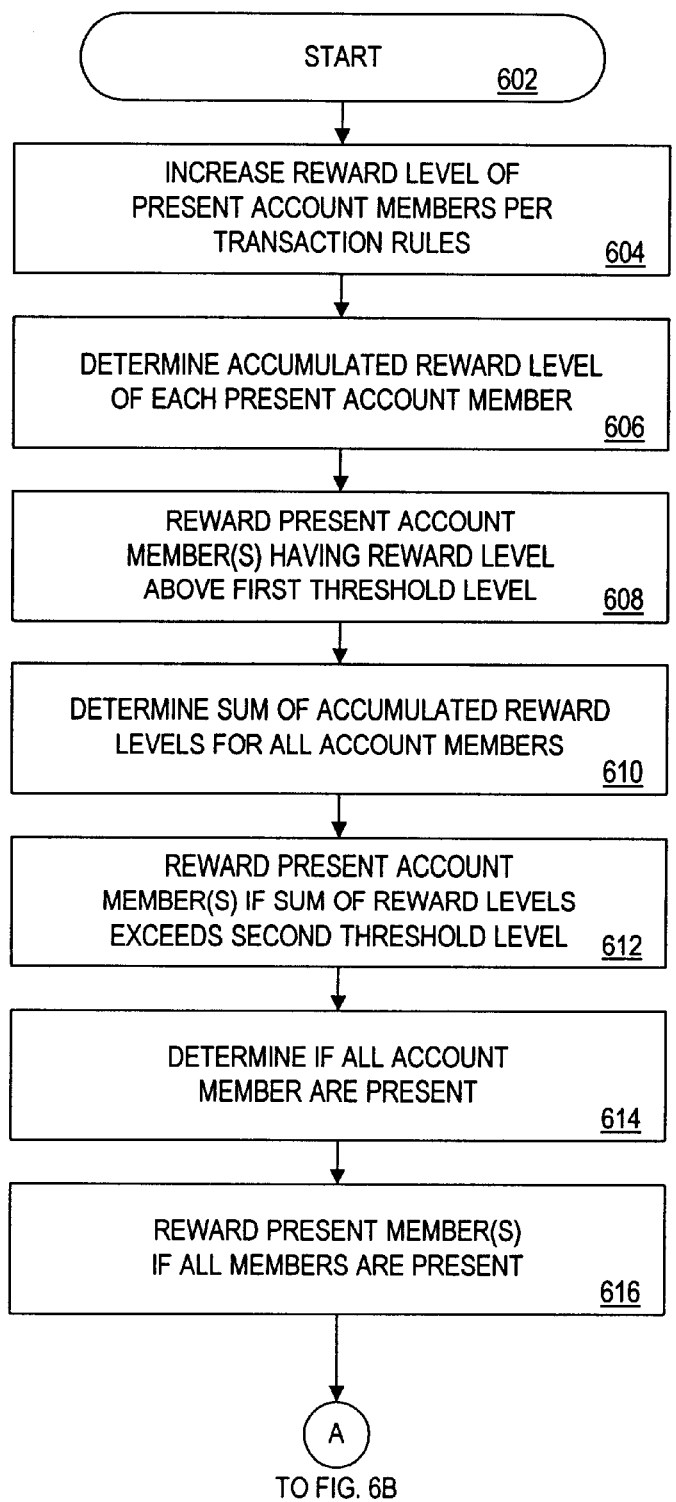
FIGS. 6A and 6B depicts a flow diagram of a reward calculation and allocation method suitable for use in the method of FIG. 2.
Figure 6B:
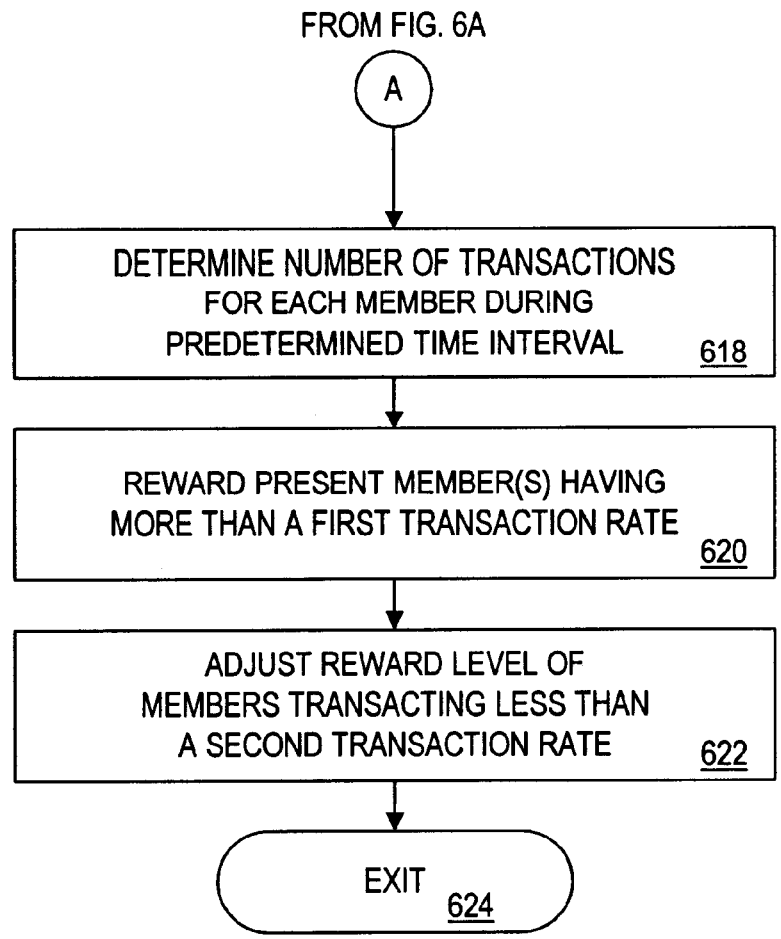

FIGS. 6A and 6B depict a flow diagram of a reward calculation and allocation method 600 suitable for use in the method 200 of FIG. 2. Specifically, FIGS. 6A and 6B depict a reward calculation and allocation method 600 suitable for use in implementing steps 230 and 235 of the method 200 of FIG. 2.

the method 600 is entered at step 602 and proceeds to step 604, where the reward level of present account members is increased per the transaction rules. That is, in step 604 each of the present, transacting account members receives a reward according to the value, items selected and other transaction rules as applied to the instant transaction. The method 600 then proceeds to step 606.

At step 606 the accumulated reward level of each present account member is determined. That is, the reward level associated with each account member plus any increase in reward level performed at step 604 is determined. The method 600 then proceeds to step 608.

At step 608 those present members having a respective reward level exceeding a first threshold level are rewarded. That is, each present member having a respective individual reward level exceeding a first threshold level is rewarded by, e.g., a discount on the transaction, a discount on a future transaction, free goods and/or services, or other rewards as appropriate to the transacting environment and described elsewhere in this disclosure. The method 600 then proceeds to step 610.

At step 610 the sum of accumulated reward levels for all members is determined. That is, the sum of reward levels for each account member present and, optionally, those account members not present is accumulated to determine a total account reward level. The method 600 then proceeds to step 612.

At step 612 the present account members are issued a reward if the reward level determined at step 612 exceeds a second threshold level. The method 600 then proceeds to step 614.

At step 614 a determination is made as to whether all of the account members are present. The method then proceeds to step 616, where, in the case of all account members being present, the present account members are issued a reward. The method 600 then proceeds to step 618.

At step 618 the number of transactions made by each account member during a predetermined time interval is determined. That is, a transaction rate associated with each account member is determined for a predetermined period of time (e.g., five transactions per week, two transactions per month, 15 transactions per year). The method 600 then proceeds to step 620.

At step 620 the present account members having a transaction rate exceeding a first transaction rate are issued a reward. The method 600 then proceeds to step 622.

At step 622 the reward levels of members transacting at less than a second transaction rate are adjusted. That is, those members insufficiently utilizing a frequent shopper card as measured by transactions per time or transaction rate are penalized in some manner such as reward level deduction, increase in the tier required in order to achieve a reward and the like. The method 600 then proceeds to step 624 where it is exited.

In one embodiment of the invention the number of people within a party is determined with respect to the quantities and/or value of an order placed by the frequent shopper card holder. In this embodiment, rather than querying as to how many members or sub-account members are present (step 220), the primary account holder enters an entire order. After receiving the entire order, the transaction controller 150 determines if the received order is for one person or for many persons. If the received order is for one person then the order is processed conventionally. If the received order is for many persons, then the transaction controller 150 prompts the card holder to swipe the frequent shopper card (if not entered already). The transaction controller 150 then outputs via, e.g., the display unit 111, the names of sub-account holders or members and a prompt is issued to the frequent shopper card holder to indicate which of the displayed names is associated with a shopper who is actually present. Frequent shopper or reward points are assessed to those members or sub-account holders who are actually present.

It should be noted that the above-described teachings of the present invention are applicable to many transaction environments. Specifically, the teachings of the present invention as defined above with respect to the various methods and apparatus utilized in the retail store transaction environment may be applied to other transaction environments, as will now be described. Moreover, the teachings of the invention as utilized by any one of the following transaction environments may be advantageously employed in any of the various transaction environments presented herein or known to those skilled in the art.

C. Drive-Through Lane Transaction Environment

In a drive-through lane embodiment, the license plate scanning unit 145 is used to determine the license number of a vehicle. As used herein, "license number" means the characters (e.g. letters and digits) of a license plate of a vehicle. The license number is linked to an account number of a frequent shopper account. The license plate scanning unit 145 is operationally situated in or near the drive through lane such that it scans and identifies the license plate of a vehicle within the lane.

In this embodiment, the display unit 111 may comprise a digital menu board that may be viewed from the vehicle within the drive-through lane. For example, in the case of a digital menu board display, the name of the primary account holder and all sub-account holders or members names may be displayed on a checklist on the digital menu board. In this manner, the primary card holder, illustratively a parent, may indicate by, e.g., voice or other input means, that some, none or all of the sub-account members are present in the vehicle. Those skilled in the art will recognize that digital menu board may also be used in a more traditional transaction environment e.g. a retail store, inside a restaurant, inside a quick service restaurant, etc.

Optionally, in the case of a primary account holder who has previously transacted using the frequent shopper account, the digital menu board may be used to display one or more previous common orders of the account holder. The driver of the vehicle may then indicate, by a voice or other input means, which of the displayed previous orders should be placed. In this manner, the amount of time required to perform a drive-through lane transaction is greatly reduced, since there is no need for the purchasing party to remember precisely what they ordered last time.

Figure 5:
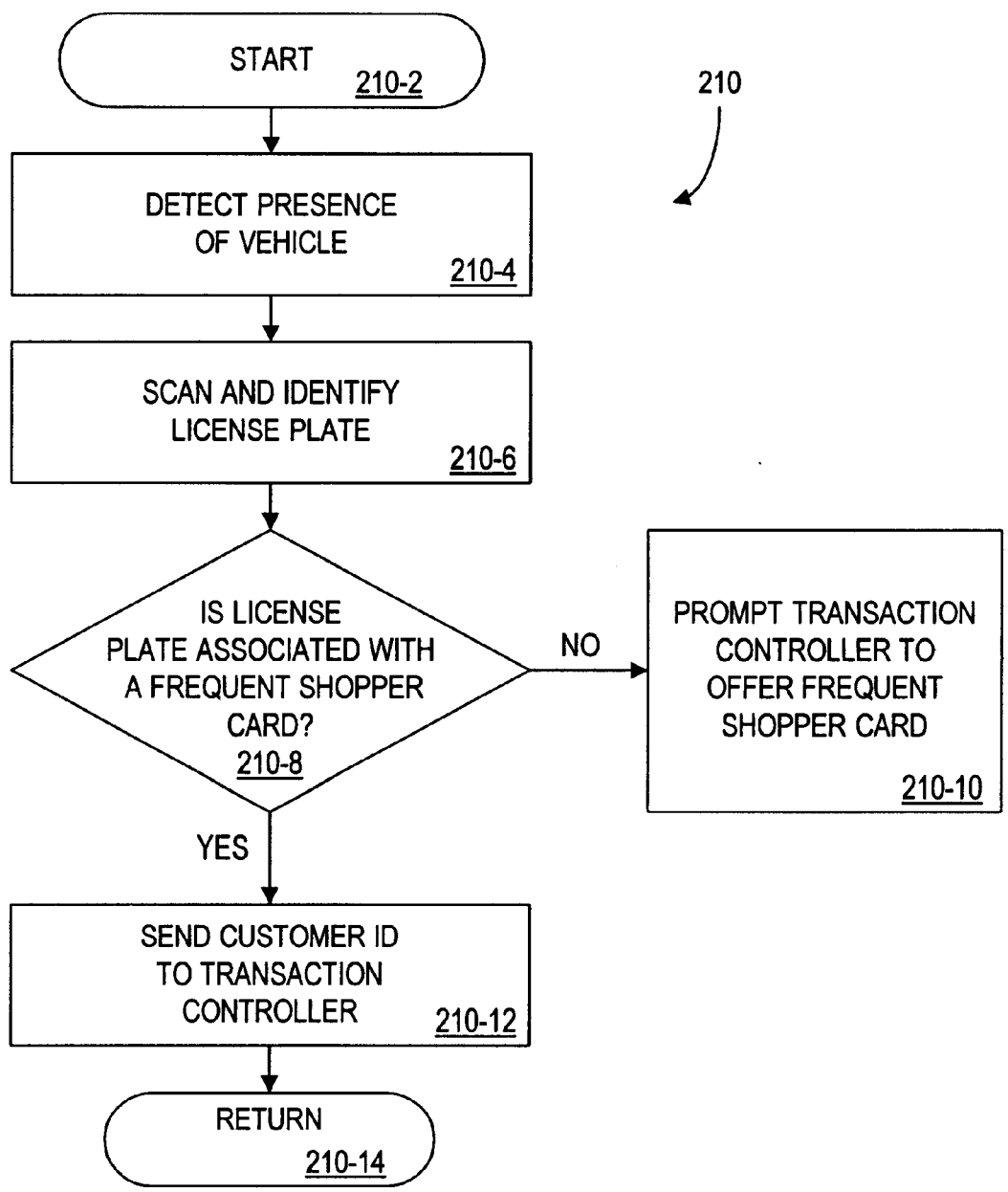
FIG. 5 depicts a flow diagram of a customer identification method suitable for use in the method of FIG. 2.

FIG. 5 depicts a flow diagram of a customer identification method suitable for use in the method 200 of FIG. 2. Specifically, FIG. 5 depicts a customer identification method 210 suitable for use in implementing step 210 of the method 200 of FIG. 2 in an embodiment of the invention utilizing the optional license plate scanning unit 145 of FIG. 1.

The method 210 is entered at step 210-2 and proceeds to step 210-4 where the presence of a vehicle is detected. That is, the method 210 waits until a vehicle enters, e.g., a drive through lane of a fast food restaurant. Upon detecting the presence of the vehicle, the method 210 proceeds to step 210-6.

At step 210-6 the license plate of the vehicle within the fast food lane is scanned and identified using, e.g., apparatus disclosed in U.S. patent application Ser. No. 09/166,339 entitled "Method and System for Maintaining a Customer Database Using License Plate Scanning Technology", filed on Oct. 5, 1998, incorporated herein by reference. After scanning and identifying the license plate, the method 210 proceeds to step 210-8.

At step 210-8 a query is made as to whether the identified license plate is associated with a frequent shopper account. If the query at step 210-8 is answered negatively, then the routine proceeds to step 210-10. If the query at step 210-8 is answered affirmatively, then the routine 210 proceeds to step 210-12.

At step 210-10 the transaction controller or clerk is prompted to offer a frequent shopper card to the occupants of the detected vehicle. The method 210 then proceeds to 210-4 to await the next vehicle.

At step 210-12 the customer ID associated with the frequent shopper card that is associated with the identified license plate is sent to the transaction controller for further processing in accordance with the method 200 of FIG. 2. The method 210 then proceeds to step 210-14 where it is exited.

D. Self-ordering Transaction Environment

In another embodiment of the invention, a restaurant includes self-ordering stations or touch screens, optionally built into dining tables or accessible from the tables. In this embodiment, a frequent shopper card is either passed through a card reader or manually entered into a built-in table screen (e.g., a touch screen). The customer information is retrieved and the customer is brought through a confirmation process to determine the present members or sub-account holders. Optionally, previously ordered food and beverage items may be displayed on the table screen (as with the digital menu board display of the drive through lane transaction environment), thereby allowing rapid entry of an order.

In addition to transacting, the built in table screens may be used to play video games, video, music or other entertainment programs 155-1, 165-1 (FIG. 1) stored in the transaction controller memory 155, server memory 165 or other memory (e.g., a cable television feed or pay per view feed). Such entertainment use of a table screen may be offered on a coin operated or vending basis or, optionally, by debiting reward points from the appropriate frequent shopper account. It must be noted that these reward points may be instantly assessed to the frequent shopper account upon ordering. Therefore, a family may come into a restaurant, sit down at a table having a table screen, enter their frequent shopper account number and place their order (prompted or directly) and instantly be assessed reward points based upon that order. These reward points may then be used to provide rewards such as discounts on the current food order or food ordered on a future visit. Alternatively, the reward points may be used as credits to allow entertainment uses of the table screens.

E. Physical Access Transaction Environment

In a physical access embodiment of the invention where the card holder is not identified, e.g. an entrance to a public transit comprising a turnstile, a method according to the invention comprises the following steps. First, the primary account holder or member passes an access card through a card reader utilized as input device 120. If the card is an "individual" card, then there is no consideration of additional users or fares. Thus, the card is returned to the user (if the card reader is the type of card reader that requires the card be drawn into a mechanism) and the physical access unit 148, illustratively the turnstile, allows access to the holder of the access card. If the access card is a "multiple user" card then it is necessary to determine how many additional users should be allowed access. In one embodiment of the invention this determination is made by swiping the access card through the card reader an additional number of times such that the additional number plus one is equal to the number of fares to be purchased. For each swipe of the access card through the card reader, one fare is deducted from the card account. In one embodiment the primary access card holder is queried as to how many fares are to be purchased. The customer then enters the number of fares to be purchased by, e.g., a touchpad or voice recognition command, then the access card is debited accordingly. After determining how many fares are to be purchased the physical access unit 148 allows a determined number of fares to proceed to the restricted area. (i.e., the public transit platform).

In a physical access embodiment of the invention where the card holder is identified, e.g. an entrance to a members-only wholesale club comprising a turnstile, a method according to the invention comprises the following steps. First, the primary account holder or member passes an access card (e.g. a frequent shopper or membership card) through a card reader utilized as input device 120. If the card is an "individual" card, then there is no consideration of additional users or fares. Thus, the card is returned to the user (if the card reader is the type of card reader that requires the card be drawn into a mechanism) and the physical access unit 148, illustratively the turnstile, allows access to the holder of the access card. If the access card is a "multiple user" card, then it is necessary to determine how many additional sub-account holders should be allowed access. In one embodiment of the invention this determination is made by prompting the primary account holder to indicate how many sub-account holders are present. The primary account holder then enters the number of sub-account holders present by, e.g., a touchpad or voice recognition command. After determining how many sub-account holders are present the sub-account holders are then prompted to identify themselves by e.g. typed input, voice input, biometric identification, and/or audio-spatial input. If the appropriate number of sub-account holders are identified, the physical access unit 148 allows the primary account holder and the determined number of sub-account holders to proceed to the restricted area. (i.e., the members-only wholesale club). After the group comprising the primary account holder and the sub-account holders bring the items selected for purchase to the POS terminal, in one embodiment the primary account holder is then prompted to identify her/himself by, e.g. swiping the access card, a touchpad or voice recognition command. Each of the sub-account holders linked to the primary account holder who identified themselves at the turnstile are registered as being physically present for the transaction, and reward points are distributed accordingly.

Figure 8A:
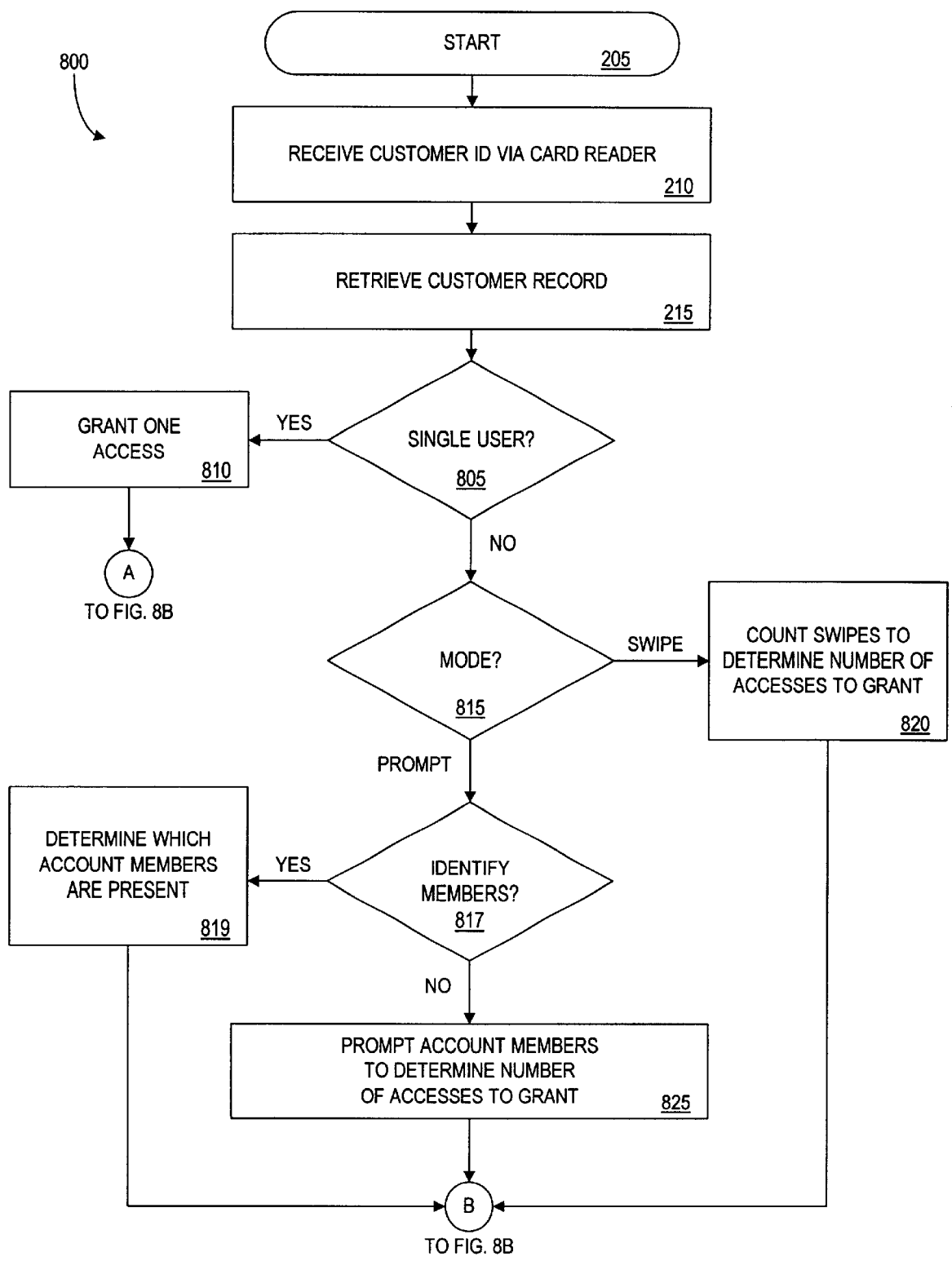
FIGS. 8A and 8B depicts a flow diagram of a transaction reward method according to a physical access embodiment of the invention.
Figure 8B:
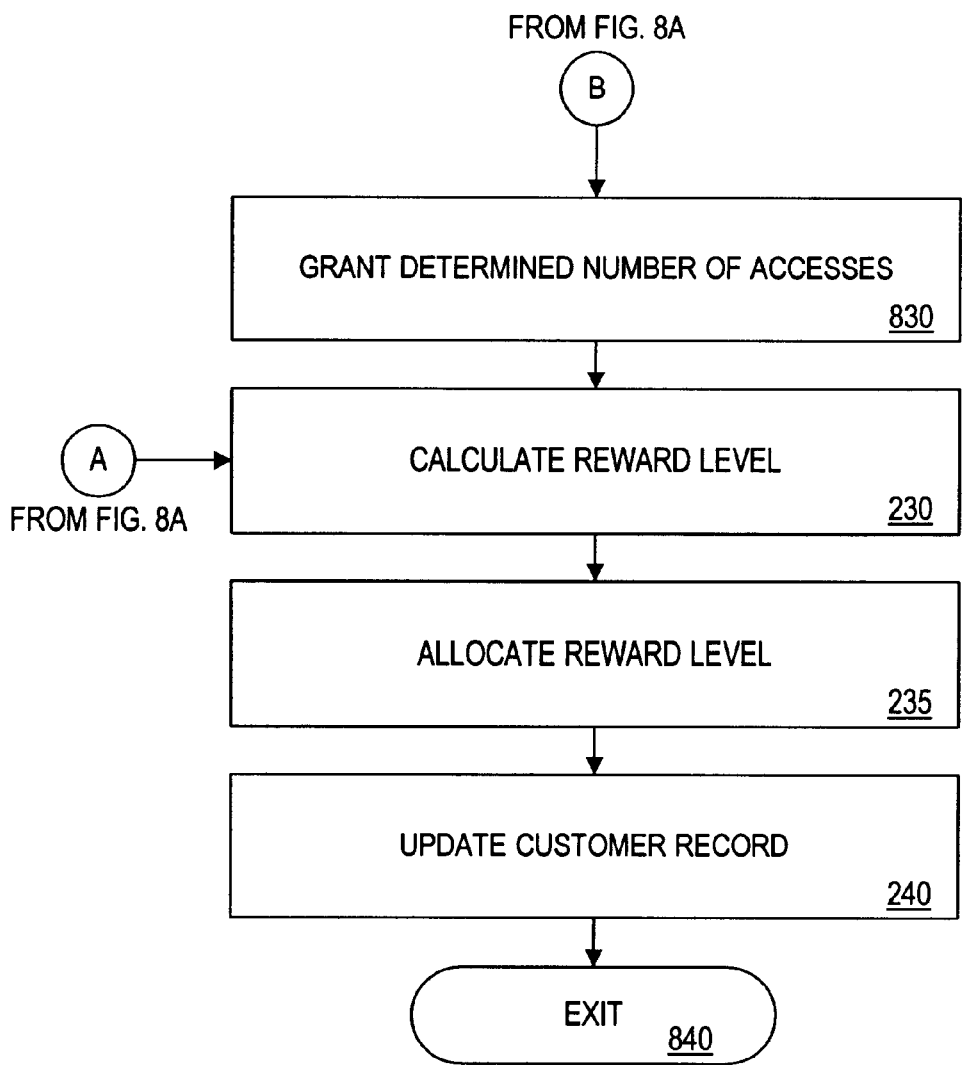

FIGS. 8A and 8B depict a flow diagram of a transaction reward method 800 according to a physical access embodiment of the invention. Specifically, FIGS. 8A and 8B depict a flow diagram of a method 200 for transacting and assessing reward points to a plurality of members using a common account associated with a frequent shopper card. It must be noted that steps 205, 210, 215, 230, 235, 240 and 245 are performed in substantially the same manner as described above with respect to FIG. 2 and, therefore, will not be discussed in further detail with respect to FIGS. 8A and 8B.

The method 800 is entered at step 205 and proceeds to step 210, where a customer ID is received via a customer swiping or passing a frequent shopper card or frequent rider card through an input device 120 comprising a card reader. The method 800 then proceeds to step 215, where the customer record associated with the received account identification are retrieved from, e.g., the store server 160 or a remote server (not shown). The method 800 then proceeds to step 805.

At step 805 a query is made as to whether the account is linked to a single member. If the query at step 805 is answered affirmatively (i.e., the account has only one member or account holder), then the method 800 proceeds to step 810. If the query at step 805 is answered negatively (i.e., the account has a plurality of members or account holders), then the method 800 proceeds to step 815.

At step 810 a single access through the physical access unit 148 (e.g., a public transit turnstile) is granted, and the method 800 proceeds to step 230.

At step 815 a query is made as to whether a "swipe" mode of operation or a "prompt" mode of operation is to be used to determine a number of accesses to be granted. If the answer to the query at step 815 is the swipe mode, the method 800 proceeds to step 820. If the answer to the query at step 815 is the prompt mode, the method 800 proceeds to step 817.

At step 820 the number of accesses to be granted is determined by counting a number of swipes of the frequent shopping card through the card reader. Optionally, the number may be displayed and altered via a keypad, touch screen, voice recognition unit, etc. by the primary account holder prior to utilizing the indicated number of accesses. The method 800 then proceeds to step 830.

At step 817 a query is made as to whether it is necessary to identify the present members associated with the frequent shopper or rider account/card. If the query at step 817 is answered negatively, then the method 800 proceeds to step 825. If the query at step 817 is answered affirmatively, then the method 800 proceeds to step 820.

At step 220 a determination is made as to which account members are physically present at the transaction point. This determination may be made in several ways, as previously described. The number of present account members comprises the determined number of accesses to be granted. The method 800 proceeds to step 830.

At step 825 the number of accesses to be granted is determined by prompting or interacting with the primary account holder, e.g., prompting the primary account holder to enter a number via a keypad or via voice recognition. The method 800 then proceeds to step 830.

At step 830 the determined number of accesses is granted, and the method 800 proceeds to step 230.

At step 230 a reward level is calculated. The method 800 then proceeds to step 235, where the calculated reward level is allocated to the primary account holder and, if the prompt mode is utilized, any other present sub-account members. The method 800 then proceeds to step 240, where the customer record is updated, and to step 840 where the method is exited.

A benefit of the above described embodiment is that the average transaction time is shorter for customers that utilize such multi-party cards. Therefore, lines are shorter and service for all customers is generally faster. Also, since the number of customers who pass through the turnstile is recorded, it is possible to track how many people are going to the store or using the public transit in a given time period.

F. High Volume Transaction Environment

In a high volume transaction environment embodiment of the invention, participants (i.e., members, account holders and sub-account holders) can indicate their physical presence to the transaction system 100 using other transaction controllers (not shown). For example, in the case of a high volume fast food establishment having a large number of point of sale (POS) terminals, a primary account holder (e.g., a teacher) may transact for a plurality of students at the first POS terminal. Each of the plurality of students may then transact at any of the POS terminals. In this manner, the restaurant avoids the annoyance of a large line of students behind a teacher at a single POS terminal. Rather, the students may disperse to multiple POS terminals, thereby alleviating congestion at the one terminal and improving the transaction experience for both the clerks and the customers. Moreover, by utilizing a frequent shopper/frequent customer card according to the invention, spending limits may be set and enforced prior to the conclusion of individual transactions, thereby excluding non-allowed purchases at the POS. The POS may also determine the number of meals ordered for a given transaction or set of transactions. By comparing the number of meals ordered to the number of account holders and sub-account holders present, it may be determined if there are more account holders and sub-account holders present than there are meals ordered, in which case the account holders and sub-account holders may be asked to re-identify themselves and their orders. In another embodiment, primary and sub-account holders can be reminded at the POS that their present order does not include items usually ordered, or, those items usually ordered may be suggested before the order is taken.

G. Affiliated Reward Programs

In one embodiment of the invention the frequent shopper card comprises a bank card, credit card or debit card. The bank credit card or debit card may be an affinity card associated with a particular establishment or a standard credit card or debit card. This embodiment is attractive due to the cross branding or cross leverage nature of promotional programs offered by, e.g., retail establishments and banking or other financial establishments offering credit/debit cards. Thus, in the case of a credit card seeking to increase customer usage, retail or other transaction environments may utilize that promotional impetus to help boost their own sales. Similarly, in the case of affinity cards sponsored by, e.g., airlines or other travel companies, rewards such as frequent flyer miles may be leveraged into the standard rewards program of a restaurant or other selling entity.

Although various embodiments which incorporate the teachings of the present invention have been shown and described in detail herein, those skilled in the art can readily devise many other varied embodiments that still incorporate these teachings.

What is claimed is:

1. A reward method comprising the steps of:
   entering an account identifier from a card presented by a cardholder;
   retrieving, in response to the account identifier, a customer record associated with said account identifier, said customer record including account information identifying a plurality of sub-account holders;
   identifying at least one sub-account holder who is present with the cardholder;
   transacting with at least one of said present sub-account holders;
   calculating a reward level;
   allocating, to at least one of said present sub-account holders, at least a portion of said determined reward level; and
   updating said retrieved customer record.

2. The method of claim 1, wherein said customer record includes, for each of said plurality of sub-account holders, a respective accumulated reward level; and wherein said step of updating comprises the step of:
   increasing, by a respective allocated amount, said respective accumulated reward level of said at least one of said present sub-account holders.

3. The method of claim 2, further comprising the step of:
   determining, for each present sub-account holder, whether a respective accumulated reward level exceeds a first reward threshold level; and
   providing, to each present sub-account holder having an accumulated reward level exceeding said first reward threshold level, a first reward.

4. The method of claim 2, further comprising the step of:
   determining whether a sum of the respective accumulated reward levels of said plurality of sub-account holders exceeds a second reward threshold level; and
   in the case of said second reward threshold level being exceeded, providing, to one or more of said present sub-account holders, a second reward.

5. The method of claim 1, wherein:
   in the case of all sub-account holders being present, providing, to one or more of said present sub-account holders, a third reward.

6. The method of claim 1, wherein:
   in the case of a sub-account holder being present during more than a first number of transactions during a time interval, said reward level allocated to said sub-account holder is modified.

7. The method of claim 1, wherein:
   in the case of a sub-account holder being present during less than a second number of transactions during a time interval, said reward level allocated to said sub-account holder is modified.

8. The method of claim 1, wherein said step of identifying comprises the steps of:
   extracting, from said retrieved customer record, a list of sub-account holders; and
   prompting a present sub-account holder to identify any other present sub-account holders.

9. The method of claim 1, wherein:
   said step of identifying comprises the steps of:
      extracting, from said retrieved customer record, a list of sub-account holders; and
      prompting a first sub-account holder to authorize one or more of the identified sub-account holders; and
   said step of transacting comprises the steps of:
      accepting, from said sub-account holders authorized by said first sub-account holder, verification indicia; and
      transacting only with verified sub-account holders having been authorized by said first sub-account holder.

10. The method of claim 9, wherein said verification indicia comprises one of a personal identification number (PIN), an alphanumeric identification and a biometric identifier.

11. The method of claim 1, wherein said step of identifying comprises the steps of:
   evaluating, using a transaction profile, said step of transacting to determine a present number of sub-account holders.

12. The method of claim 11, wherein:
   said transaction profile comprises one of a default transaction profile and a refined transaction profile;
   said default transaction profile including profile information related to a typical transaction; and
   said refined transaction profile including profile information related to prior transactions of one or more of said sub-account holders.

13. The method of claim 12, wherein said customer record includes said refined transaction profile, and said step of updating includes the step of updating said refined transaction profile in response to said step of transacting.

14. The method of claim 1, wherein said customer record includes, for each of said plurality of sub-account holders, respective performance data, said method further comprising the steps of:
  evaluating, for each present sub-account holder and with respect to one or more reward rules, a corresponding one or more transaction parameters to produce performance data associated with at least said each present sub-account holders; and
  updating, in response to said performance data, said retrieved customer record.

15. The method of claim 14, wherein:
  sub-account holder membership within a particular class is initiated in response to a first set of parameters indicative of a purchase profile or demographic profile appropriate to said particular class; and
  sub-account holder membership within a particular class is terminated in response to a second set of parameters indicative of a purchase profile or demographic profile inappropriate to said particular class.

16. The method of claim 1, wherein said reward comprises, in either tangible or intangible form, at least one of a discount on a present purchase, a credit on a present purchase, a discount on a future purchase, a credit on a future purchase and a coupon for additional goods or services.

17. The method of claim 1, wherein each of said sub-account holders is associated with one or more account classes, each of said classes being associated with a respective reward structure.

18. The method of claim 1, wherein the account identifier is entered via one of a data entry terminal, a magnetic card reader, a mechanical card reader, and an optical card reader.

19. The method of claim 1, wherein:
  said step of identifying is performed after said step of transacting is completed; and
  said step of identifying comprises the steps of:
    comparing, to a utilization profile, said transaction to determine if said transaction is indicative of a single present sub-account holder or a plurality of present sub-account holders; and
    in the case of said transaction being indicative of the presence of a plurality of sub-account holders, performing the steps of:
      extracting, from said retrieved customer record, a list of sub-account holders; and
      prompting a present sub-account holder to identify any other present sub-account holders.

20. The method of claim 1, wherein said step of identifying comprises the step of:
  interacting, via a transacting terminal, with a first present sub-account holder to identify other present sub-account holders.

21. The method of claim 1, wherein said step of identifying comprises the steps of:
  prompting a first present sub-account holder to identify other present sub-account holders; and
  receiving, from said first present sub-account holder, information identifying other present sub-account holders.

22. The method of claim 1, wherein said step of identifying comprises the step of:
  receiving information from one or more present sub-account holders indicative of the presence of said one or more present sub-account holders.

23. The method of claim 1, wherein the account identifier is conveyed via one of a frequent shopper card, a credit card and a debit card.

24. The method of claim 1, further comprising the step of providing access to entertainment functionality of a self ordering station in exchange for one of an earned reward level and an additional payment.

25. The method of claim 24, wherein said self ordering station interacts with said present sub-account holders via a terminal, and said entertainment functionality comprises an interactive or passive video functionality.

26. The method of claim 1, wherein:
  said step of identifying comprises the step of prompting a present sub-account holder to provide information indicative of the number of persons to be provided physical access at a physical access point; and
  said step of transacting comprises the steps of:
    receiving said information indicative of the number of persons to be provided physical access; and
    allowing physical access to said indicated number of persons.

27. The method of claim 26, wherein said step of receiving said information indicative of the number of persons to be provided physical access comprises counting a number of times the account identifier is provided prior to a physical access by a person.

28. The method of claim 26, wherein said step of receiving said information indicative of the number of persons to be provided physical access comprises receiving, from a data entry means, a numeric input.

29. A reward method comprising the steps of:
  scanning a vehicle license plate carried by a vehicle to determine a license number of an account holder;
  retrieving a customer account number associated with the license number and a customer record associated with the customer account number, the customer account record including account information identifying a plurality of sub-account holders;
  transacting with the account holder;
  identifying at least one sub-account holder present in the vehicle;
  transacting with the sub-account holder; and
  providing a reward to the sub-account holder present in the vehicle.

30. The method of claim 29, wherein said step of identifying includes the steps of:
  displaying, on a display device visible to one or more occupants of said vehicle, indications of one or more sub-account holders identified by the customer record; and
  receiving, via a data entry means, an indication of which sub-account holders are present in the vehicle.

* * * * *